(12) United States Patent
Micheli

(10) Patent No.: US 8,894,147 B2
(45) Date of Patent: Nov. 25, 2014

(54) SEATING ASSEMBLY AND A METHOD FOR MAKING A SEATING ASSEMBLY

(71) Applicant: John Micheli, Dearborn, MI (US)

(72) Inventor: John Micheli, Dearborn, MI (US)

( * ) Notice: Subject to any disclaimer, the term of this patent is extended or adjusted under 35 U.S.C. 154(b) by 154 days.

(21) Appl. No.: 13/694,987

(22) Filed: Jan. 24, 2013

(65) Prior Publication Data

US 2014/0152062 A1 Jun. 5, 2014

Related U.S. Application Data

(63) Continuation of application No. 12/660,998, filed on Mar. 9, 2010, now abandoned.

(51) Int. Cl.
| *A47C 15/00* | (2006.01) |
| *B60N 2/01* | (2006.01) |
| *A47C 11/00* | (2006.01) |
| *B60N 2/24* | (2006.01) |
| *B60N 2/68* | (2006.01) |

(52) U.S. Cl.
CPC . *B60N 2/01* (2013.01); *A47C 11/00* (2013.01); *B60N 2/24* (2013.01); *B60N 2/242* (2013.01); *B60N 2/68* (2013.01); *B60N 2/682* (2013.01)
USPC .......................................... 297/248; 297/232

(58) Field of Classification Search
CPC .... B60N 2/242; B60N 2/3095; B60N 2/3011; A47C 1/124
USPC .......................... 297/232, 248; 296/63–65.09
See application file for complete search history.

(56) References Cited

U.S. PATENT DOCUMENTS

| 1,973,229 | A | * | 9/1934 | Smith ................................ 5/126 |
| 3,174,741 | A | * | 3/1965 | Wolff ............................. 267/110 |
| D253,142 | S | * | 10/1979 | Herman ......................... D6/370 |
| 4,285,542 | A | * | 8/1981 | Boisvert ..................... 297/217.7 |
| 4,630,864 | A | * | 12/1986 | Toll ................................ 297/232 |
| 5,292,172 | A | * | 3/1994 | Watts et al. ................... 297/127 |
| 5,553,551 | A | * | 9/1996 | Crombie ....................... 108/181 |
| 6,676,211 | B1 | * | 1/2004 | Figueras Mitjans .......... 297/232 |
| 6,811,226 | B1 | * | 11/2004 | Kamrath .................. 297/440.14 |
| 2003/0160484 | A1 | * | 8/2003 | Ware et al. .................... 297/248 |
| 2008/0157571 | A1 | * | 7/2008 | Richardson ................ 297/188.1 |
| 2009/0146467 | A1 | * | 6/2009 | Waite et al. ..................... 297/55 |
| 2010/0176620 | A1 | * | 7/2010 | Micheli ........................... 296/63 |

* cited by examiner

*Primary Examiner* — David R Dunn
*Assistant Examiner* — Alexander Harrison
(74) *Attorney, Agent, or Firm* — John G. Chupa

(57) ABSTRACT

A plurality of seating assemblies 9, 10, 7 which may be operatively deployed upon a selectively movable assembly 12 and which includes independently formed and ribbed members what make the deployed seat assemblies light weight and durable.

2 Claims, 15 Drawing Sheets

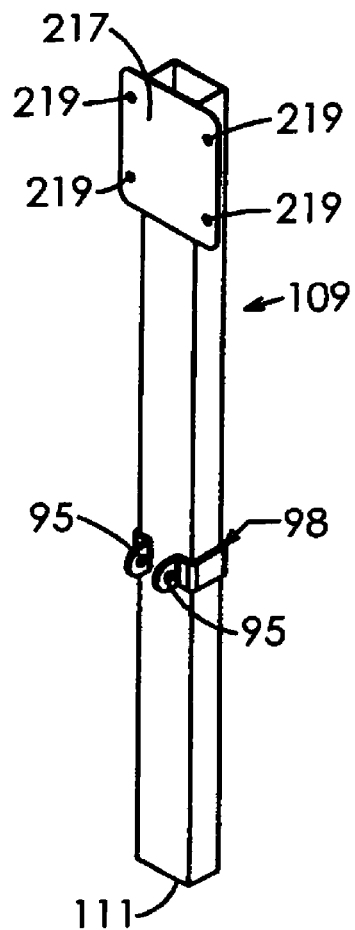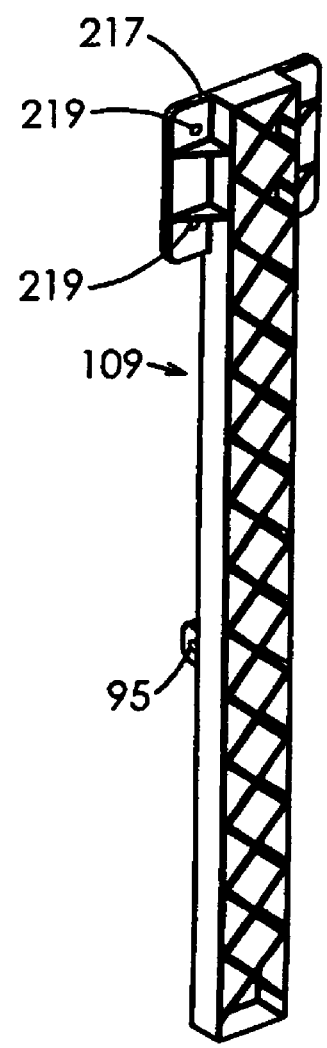
FIGURE 2A  FIGURE 2B

SEATING ASSEMBLY AND A METHOD FOR MAKING A SEATING ASSEMBLY

This is a Continuation of pending U.S. patent application Ser. No. 12/660,998, which was filed on Mar. 9, 2010, which is currently pending, and from which priority is claimed.

GENERAL BACKGROUND

1. Field of the Invention

The present invention generally relates to a seating assembly and to a method for making a seating assembly and, more particularly, to a relatively lightweight and durable seating assembly which may be made in a relatively uncomplicated and cost effective manner.

2. Background of the Invention

Seating assemblies are used in a wide variety of applications which require that individuals be given some sort of apparatus upon which to sit and/or generally repose.

On such non-limiting application involves the use of a seating assembly upon the "bed" or storage platform of a truck or personnel carrier and is effective to allow troops or other types of individuals to be relatively and comfortably transported to certain locations.

While such transport-type seating assemblies do allow for the selectively transportation of troops and/or other types of individuals, they are relatively costly to make and difficult and costly to assemble due to the use of many sub-components, they are prone to structural fatigue types of failure, and they are relatively heavy, thereby undesirably increasing the amount of fuel required by the vehicle upon which they are deployed. Many further disadvantages are associated with current transport-type seating assemblies. There is a need to overcome these various disadvantages and the various present inventions attempt to and, indeed do, overcome these and other disadvantages which may not be specifically described above.

SUMMARY OF THE INVENTION

It is a first non-limiting object of the present invention to provide a seating assembly which overcome some or all of the various drawbacks associated with current and prior seating assemblies, such as by way of example and without limitation, those which may be previously referred to.

It is a second non-limiting object of the present invention to provide a method for making a seating assembly which overcomes some or all of the drawbacks associated with current and prior methodologies, such as by way of example and without limitation, those which may be previously referred to.

It is a third non-limiting object of the present invention to provide a seating assembly strategy which allows for the creation of a seating assembly which is relatively light weight, made in a cost effective manner, and which is relatively durable and structurally sturdy.

According to a first non-limiting, aspect of the present invention a seat assembly is provided, comprising a plurality of substantially identical ribbed seat members, wherein each of the plurality of substantially identical ribbed seat members are linearly coextensive and have respective and opposed ends; a first seat support assembly which is coupled to a first of the opposed ends; a second seat support assembly which is coupled to a respective second of the opposed ends; a plurality of substantially identical ribbed back rest members, wherein each of the plurality of substantially identical back rest members are linearly coextensive and have respective first and second ends; a plurality of hollow and or hollow end with ribbed structure canopy reception members which are coupled to the plurality of substantially identical ribbed back rest members, wherein each have a respective longitudinal axis of symmetry which is perpendicular to each of the plurality of backrest members and wherein a first one of the plurality of the hollow canopy reception members is deployed proximate to first respective ends of the backrest members and wherein a second one of the plurality of said hollow canopy reception members is deployed proximate to second respective ends of the back rest members; and a plurality of substantially identical leg members which are respectively coupled to unique seat support assemblies and which respectively form an acute angle with respective to the seat members.

According to a second non-limiting aspect of the present invention, a method for making a seat assembly is provided, comprising the steps of forming a plurality of ribbed seat members; forming a plurality of ribbed back seat rest members; coupling the plurality of ribbed backseat members to the plurality of seat members; forming a plurality of leg members, and coupling the plurality leg members to the plurality of seat members, thereby forming a seat assembly According to a third non-limiting aspect of the present invention, a seat assembly is provided, comprising a plurality of ribbed seat members formed by the process of injection molding and/or other plastic forming methods; a plurality of hollow seat support members formed by the process of injection molding and/or other plastic forming methods; a plurality of canopy reception members formed by the process of injection molding having molded bolt holes; a plurality of back seat members formed by the process of injection molding, wherein the plurality of backseat members are coupled to the plurality of canopy reception members and wherein the plurality of canopy reception members are coupled to said plurality of seat support members, thereby forming a seating assembly.

According to a fourth non-limiting aspect of the present invention, a seat assembly is provided and includes a plurality of coupled seat members which are formed as one item in one single mold operation, each of said coupled seat members having a ribbed body, being linearly coextensive, and having respective and opposed ends; a first seat support assembly which is coupled to a first of the opposed ends; a second seat support assembly which is coupled to a respective second of the opposed ends; a plurality of substantially identical ribbed back rest members, wherein each of the plurality of substantially identical back rest members are linearly coextensive and have respective first and second ends; a plurality of hollow and or hollow end with ribbed structure canopy reception members which are coupled to the plurality of substantially identical ribbed back rest members, wherein each have a respective longitudinal axis of symmetry which is perpendicular to each of the plurality of backrest members and wherein a first one of the plurality of the hollow canopy reception members is deployed proximate to first respective ends of the backrest members and wherein a second one of the plurality of said hollow canopy reception members is deployed proximate to second respective ends of the back rest members; and a plurality of substantially identical leg members which are respectively coupled to unique seat support assemblies and which respectively form an acute angle with respective to the seat members.

These and other features, aspects, and advantages of the present invention will become apparent upon a reading of the following detailed description of the preferred embodiment of the invention, including the subjoined claims, and by reference to the following drawings which form a portion of this description.

BRIEF DESCRIPTION OF THE DRAWINGS

FIGS. 2(a-b) are respective front and back perspective views of a center backrest member which forms part of the side seating assemblies which are shown in FIG. 1.

FIGS. 16(a-b) is a side view of a mold made in accordance with the teachings of the preferred embodiment of the invention, wherein

DETAILED DESCRIPTION OF THE PREFERRED EMBODIMENT OF THE INVENTION

Figure 1:
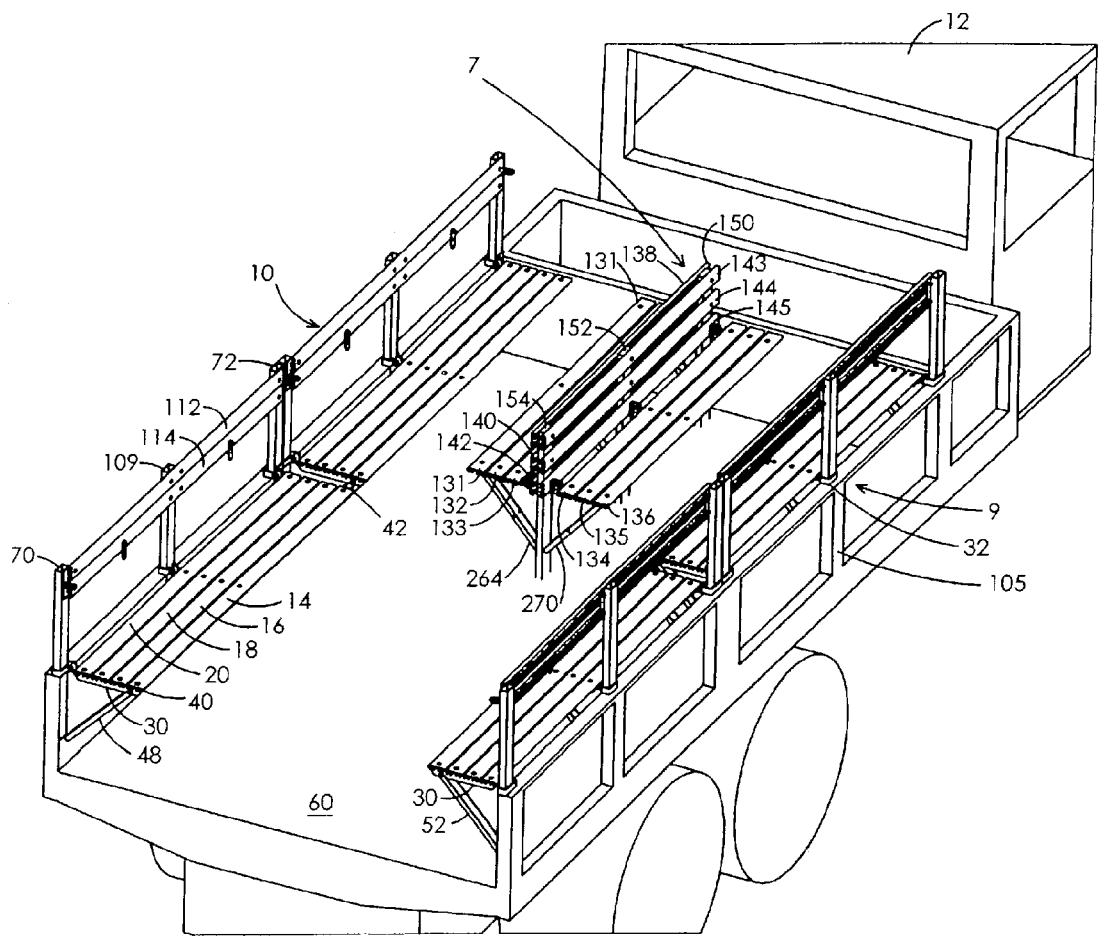
FIG. 1 is a top view of a selectively movable assembly which incorporates a pair of the seating assemblies of the preferred embodiment of the invention and which further incorporates, as an alternate embodiment, a center type seat assembly.
Figure 3A:
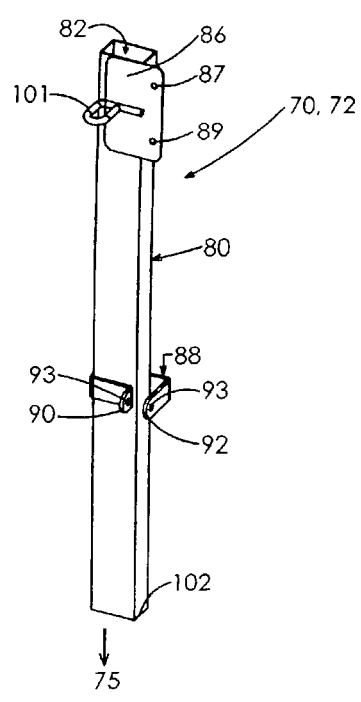
FIGS. 3(a-b) are respective front and back perspective views of an edge backrest member which forms part of the side seating assemblies which are shown in FIG. 1.
Figure 3B:
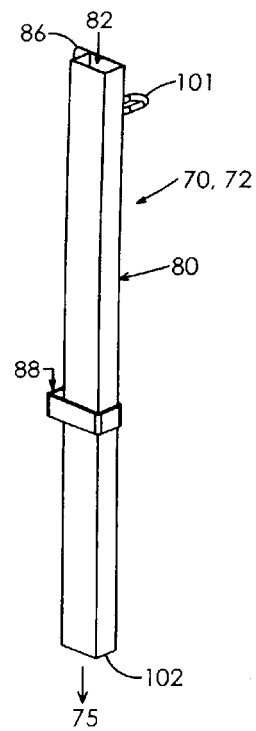
Figure 4:
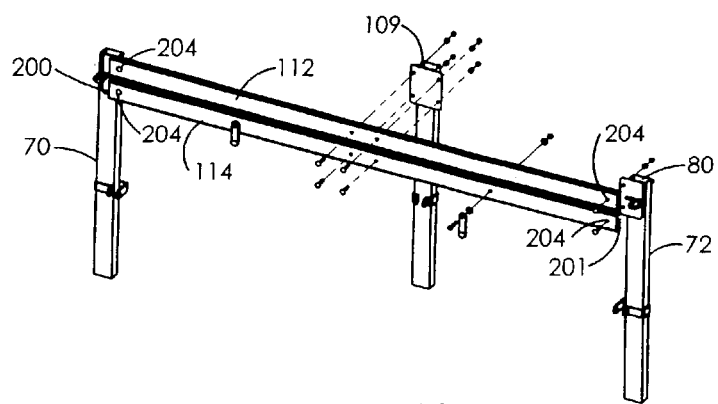
FIG. 4 is an unassembled perspective view of the backrest portion of each of the side seating assemblies which are shown in FIG. 1.
Figure 5:
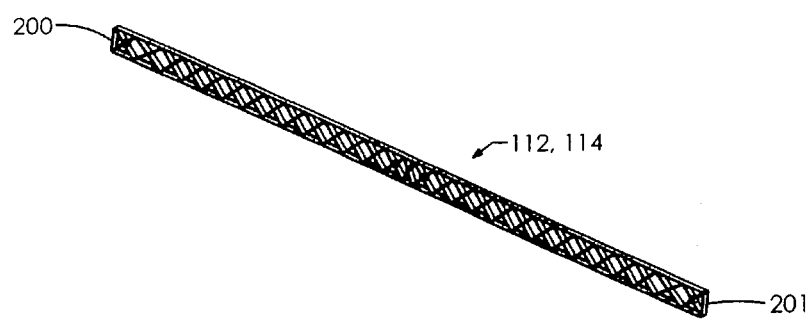
FIG. 5 is a perspective view of a backrest member which forms part of the side seating assemblies which are shown in FIG. 1.
Figure 6A:
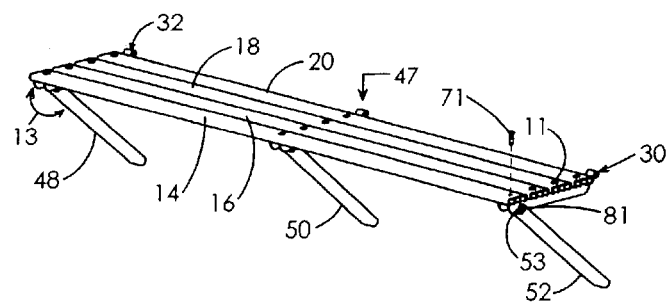
FIGS. 6(a-b) are respective and perspective and partial assembled views of the seating support portion of the seating assemblies which is shown in FIG. 1.
Figure 6B:
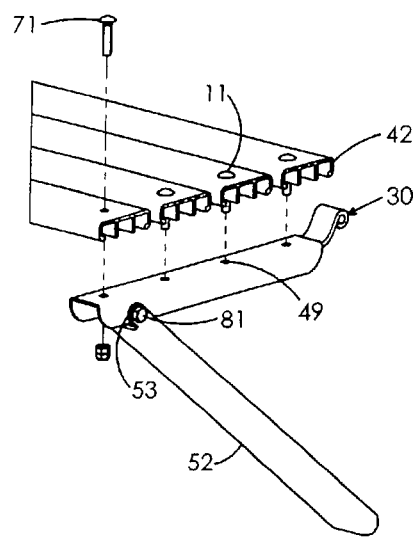

Referring now to FIGS. 1 and 2, there is shown a seating assembly 10 which is made in accordance with the teachings of the preferred, although non-limiting embodiment of the invention and which, by way of example and without limitation, may be deployed opposed sides of a selectively movable vehicle. That is, two such substantially identical edge seating assemblies 9, 10 are shown as being operatively deployed within a selectively movable vehicle 12, such as, by way of example and without limitation, a troop personnel carrier. A center assembly is also shown. It should be appreciated that a seating assemblies 7, 9, 10 may be operatively deployed in a myriad number of dissimilar types of selectively movable vehicles, such as pick-up type trucks, military and non-military trucks, and commercial and non-commercial vehicles. Nothing in this description is meant to limit the present invention(s) to use within a particular type of vehicle or selectively movable assembly. Rather, assemblies 7, 9, 10 may each be independently and operatively used upon and/or within substantially any assembly which is adapted to be selectively movable. Further, it should be appreciated that any number of such assemblies 9, 10 may be selectively and operatively deployed within and/or upon a selectively movable assembly, such as assembly 12 and in various respective desired locations. Assemblies 9 and/or 10 and/or 7 may be deployed outside of the vehicle 12 such as, by way of example and without limitation, upon the ground upon which vehicle 12 resides.

One of the two substantially identical "side deployed" seating assemblies 10, shown in FIG. 1, will now be explained in greater detail, it being understood the following discussion applies equally as well to the other or second "side deployed" assembly 9 shown in FIG. 1. As shown, in an alternate and non-limiting embodiment, a center seating assembly 7 may also be deployed upon the selectively movable vehicle 12. Multiple types of center seating assemblies 7 may be independently and operatively deployed as desired and the center seating assembly 7 will also be described.

As shown best in. FIGS. 1, 6, 7 and 8, the seating assembly 10 includes a plurality of substantially rectangular and substantially identical seating members 14, 16, 18, 20 which are arranged in a mutually and linearly coextensive manner and which have a respective body 22 which is ribbed (or which respectively has some other geometrical structural pattern formed in the respective bodies). By the term "ribbed", it is meant that the body 22 includes a plurality of ribs 24 which may or may not be substantially identical. The ribs 24 (or cells) may or may not be outwardly protruding (such as in the form of protuberances), they may represent one or more openings, or they may be inwardly protruding in the form depressions or dimples. The shape and size of the ribs 24 may be modified as desired and they may even be of a honeycomb shape and, importantly, the members 14-20 may each be separately and independently formed by the process of injection molding. In one non-limiting embodiment, the ribs 24 are formed on only one side 25 of a body 22, leaving the opposite side 5 to remain or be smooth and comfortable for a person to sit on or to form a substantially smooth surface to place items/materials upon. In this non-limiting embodiment, the opposite side 5 is a smooth continuous surface.

The seating assembly 10 further includes a pair of substantially identical side seat assembly members 30, 32 and each of the members 30, 32 includes a generally narrow and "L" shape body 34 having a longitudinal trench 36 which is formed within a first body portion 37, and a bulbous end 38 which is formed upon an inflected body portion 39 which integrally terminates upon portion 37 and which forms an obtuse angle 19 with portion 37. The bulbous end 38 resides above the first portion 37 and trench 36 in one non-limiting embodiment, extends within the body portion 39 and terminates upon and within the end 38. Each of the members 14, 16, 18, and 20 have respective and opposed ends 40, 42 and each respective end 40 resides upon and is coupled to body portion 37 of member 32 and each respective end 42 resides upon and is coupled to body portion 37 of member 30. In a non-limiting embodiment of the invention, a third member 47, which is substantially similar to members 30, 32 may be coupled to the members 14, 16, 18, 20, between respective ends 40, 42, and the members 30, 32, and 47 are linearly coextensive and mutually parallel.

Importantly the members 30, 32, 47 may each be separately and independently formed by an injection molding process and within this injection molding process, a plurality of substantially similar and equidistantly spaced holes 49 may be formed upon body 37 and each such pre-formed hole 49 may be aligned with a unique one of the pre-formed holes 11 which may be formed on each respective end 40, 42 of each member 14, 16, 18, 20 and each respective and unique pair of aligned holes 49, 11 may selectively receive a fastener, such as a bolt 71 (or the combination of a bolt and a securing nut). The bolts 71 therefore, cooperatively coupling members 14, 16, 18, 20 to the members 30, 32 47. Further, by "pre-forming" these holes 11, 49 within a single injection mold, the holes 11, 49 may be formed in a consistently desired geometric manner. Integrally formed holes 31 may also be formed in each portion 37, as well as opening (a "through hole" type opening) 100 in each portion 38.

The seating assembly 10 further includes a plurality of substantially identical support or leg members 48, 50, 52 which are respectively coupled to and from respective acute angles 13 with members 30, 47, 32 and which are adapted to be selectively coupled to the bed 60 of the selectively movable assembly 12 by use of a welded connection, by bolts, or by other conventional fastening strategies, or by simple insertion into preformed cut-outs in the bed 60. Importantly, members 48, 50, 52 may each be separately and independently formed by an injection molding process (or other composite forming process) and each member 48, 50, 52 may have a respective integrally formed hole 53 which is aligned with a unique hole 31 of a unique member 30, 32, 47 and the respectively aligned holes 53, 31 may receive a bolt 81 (or the combination of a bolt and a securing nut). Therefore, bolts 81 cooperatively and respectively couple member 48, 50, 52 to the members 30, 47 and 32.

Further, the seating assembly 10 (see for example, FIGS. 3, 4, 5, 9) includes a plurality (typically a pair) of substantially identical edge seat or post/canopy reception members 70, 72 and each of these members 70, 72, includes a generally rectangular hollow body 80 which forms or includes an internal trench or cavity 82 and which further integrally includes a flange portion 86 having a plurality of substantially identical openings or holes 87, 89, and an integrally formed and substantially "U"-shaped clasp portion 88 having substantially identical and rounded ends 90, 92. Each of the ends 90, 92 has a respective and substantially identical opening 93. The openings 93 are aligned. The members 70, 72, may each be formed by an injection molding process (or other composite forming process) and each trench 82 has a respective longitudinal axis of symmetry 75 and each trench 82, in one non-limiting embodiment, is positioned throughout a body 70, 72. In another non-limiting embodiment, clasp portion 88 may be integrally formed with the body 80 in a single molding operation. Trench 82 may selectively receive a canopy member. A hook 101 maybe deployed upon each flange portion 86. In various alternate embodiments, the cavity 82 may only extend a length which is less than the entire length of body 80 or other geometrically shaped formations may reside on the exterior surfaces of body 80 and/or upon the portions of the body 80 which bound the trench 82.

Each member 70, 72, is respectively coupled to the respective portion 38 of a unique one of members 30, 32. That is, each respective and aligned and unique pair of holes 93 is aligned with a unique one of the openings 100 (e.g., each portion 38 has a unique opening 100). In this manner, a fastener may be selectively inserted into and through each of the respectively aligned pair of holes 93 and hole 100, thereby securing each of the members 70, 72, to a respective and unique one of the members 30, 32, Further, each respective end 102 of each member 70, 72, may be respectively secured to the bed 60 of the selectively movable assembly 12 by use of a welded connection, or by insertion into a pre-formed opening within the bed 60. Alternatively, each respective end 102 may be selectively and frictionally secured within respective hollow pedestals 105, which emanate from the bed 60.

The assembly 10, as shown perhaps best shown in FIGS. 2(a-b) and further includes a center assembly member 109 which is substantially identical to members 70, 72 but which does not have a hook 101 and further has a bracket 217 which includes substantially identically identical holes 219 at each corner. The member 109 has an end 111 which is either fastened directly to the bed 60 (e.g., by use of a welded type connection) or is deployed within one of the pedestals 105. The member 109 is coupled to portion 38 of member 47 by having holes 95 of the portion 98 of member 109 be aligned with hole 100 of portion 38 of member 47 and by having a fastener, such as a bolt be inserted into these aligned holes 95, 100. The bolt may be secured in this fastening position by use of a bolt, or another fastening strategy may be employed. Holes 95 are substantially similar to holes 93 and portion 98 in substantially similar to portion 88.

Further, as is perhaps best shown in FIGS. 1, 3, 4 and 5, the seat assembly 10 includes a plurality of back rest members 112, 114, which are substantially identical, which are substantially rectangular, and which are deployed in a longitudinally coextensive arrangement and which are respectively coupled to the members 70, 72, 109, and such coupling may be achieved by the use of a welded connection or substantially any other type of fastener strategy and/or insertion strategy. Ribs or substantially any other geometric type formations may be created on any or all of the respective surfaces of each of the members 112, 114. In one non-limiting embodiment, each respective end 200, 201 of each member 112, 114 is coupled to flange 86 (each end 200, 201 has a respective hole 204 which is made to be aligned with a unique hole 87, 89 and a unique one of the flanges 86). A bolt is secured through each of the respectively aligned holes. The hook 101 protrudes through and between the fastened members 112, 114 and may be used to secure items on the bed 60. Each of the members 112, 114, are perpendicular to each of the longitudinal axis of symmetry 75. The back rest members 112, 114, may have ribs or dimples formed thereon, and may be independently and separately created by the process of injection molding (or other composite forming process). The backrest members 112, 114 are also attached to member 109. For example, bracket 217 is coupled to members 112, 114 by bolts which respectively enter unique holes 219 after protruding through one of the members 112, 114. In an alternate embodiment, as shown best in FIG. 7(b), the members 30, 32, 47 may have ribs or other geometrically shaped portions 700 formed within the trench 36

Referring now to FIGS. 1, 10, 11, 12, 13, and 14, there is shown a center seat assembly 7 which is made in accordance with the teachings of the preferred embodiment of the invention.

The center seat assembly 7 includes, in one non-limiting embodiment, a plurality of substantially identical, generally rectangular, linearly coextensive seat members 131, 132, 133, 134, 135 and 136 and substantially identical back rest members 138, 140, 142, 143,144, 145. The assembly 7 further includes post members 150, 152, 154, which are coupled to the bed 60. by use of a welded connection, fastened using conventional fasteners, or inserted into preformed holes within the bed 60, and which protrude from the bed 60.

The assembly 7 includes a plurality (typically six) of substantially identical connection members 200 and each member 200 has a body 202 having a trench 207 which is formed within the trench channel containing portion 204 of the body 202. The trench 207 and the portion 204 integrally terminate into a protruding end 206. End 206 includes a pair of substantially identical flanges 205, 210, each having a respective hole 212, 214 and each hole 212, 214 is substantially identical and aligned.

Seat members 131, 132, 133 are coupled to and reside upon respective portions 204 of three members 200 (i.e., each member 131, 132, 133 are coupled to a respective portion 202 of three distinct members 200). That is, each member 130, 131, 132, is respectively coupled to a unique member 200 at their respective middle portion and at each of their respective opposed ends. The members 200 are respectively coupled to respective and unique hinges 220 and reside on respective posts 150, 152, and 154 (e.g., the aligned holes 212, 214 of each of such members 200 respectively receive hinge 220). That is, holes 212, 214 may each receive a protrusion or fastener 211 (e.g., portion 206 is deployed upon each end of protrusion 211) and nuts may be deployed upon protrusion 211 which emanates from the aligned holes 212, 214, to fix protrusion 211 within holes 212, 214.

Figure 15:
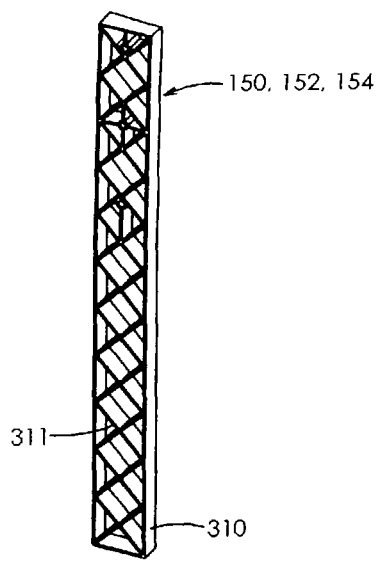
FIG. 15 is a perspective view of a backrest assembly member which forms a portion of the center seat assembly which is shown in FIG. 1.

Three additional seat members 134, 135, 136 are coupled to a second set of three members 200 at each of their respective ends and at their respective middle portions, and this second set of three members 200 are each respectively and similarly coupled to posts 150, 152,154. That is, the coupling strategy is similar to what has been previously discussed. Backseat members 138, 140, 142, 143, 144, 145 are each coupled to posts 150, 152, 154. Leg members 260, 262, 264 are coupled to support members 200 and to the bed 60 and leg members 266, 268, 270 are coupled to support members 200 and to bed 60. As shown best in FIG. 15, each of the members 150, 152, 154 may have a honeycomb shaped body 310. That is, each body 310 may have honeycomb shaped opening 311 or another geometrically shaped protrusions and/or indentations.

Figure 16A:
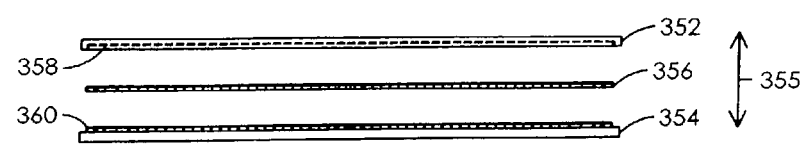
FIG. 16(b) is a side engaging view of the mold and FIG. 16(a) is a side non contacting and retracted view.
Figure 16B:
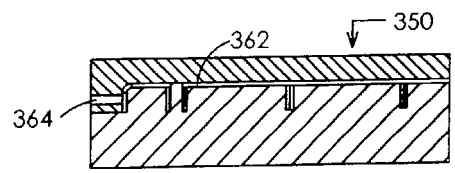
Figure 17A:
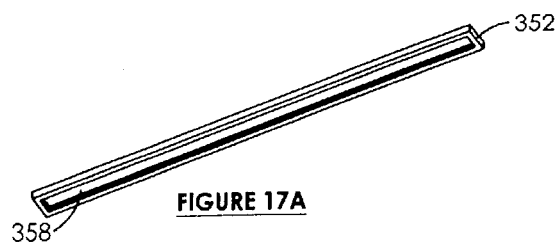
FIG. 17(a-b) are respective top perspective views of the top and bottom portion of the mold shown in FIG. 16.
Figure 17B:
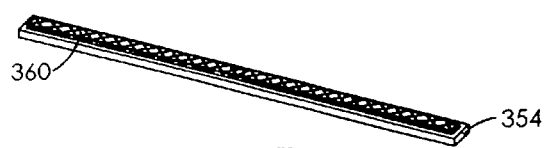

Referring now to FIGS. 16(a-b) and 17(a-b), there is shown an injection mold 350 which is made in accordance with the teachings of the preferred embodiment of the invention.

Particularly, mold 350 includes a first portion 352 and a second portion 354. Portion 352 is reciprocally movable with respect to the second portion 354 (in opposed directions shown by double ended arrow 355). When the portions are made to engage, forming surfaces 358, 360 form a cavity 362 into which liquid 364 is injected. When the injected liquid 364 hardens, portion 352 is moved away from portion 354, and the hardened liquid is made to form a solid or hardened shape of the cavity 362. The portions 358, 360 may be modified as desired to form various desired shapes. Alternatively, a formed blank 356 may be selectively inserted between surfaces 358, 360, and the mold may be configured so that these surfaces cooperatively engage the blank 356 to form the blank 356 into the desired shape and size.

The use of the foregoing injection molding process (or other composite forming process) allows the various previously discussed members to be associated with assembly 10 to be made in a relatively uncomplicated and cost effective manner and allows all or some of the members 109, 70, 72, 112, 114, 14, 16, 18, 20, 32, 47, 30, 48, 50, 52, 131, 132, 133, 134, 135, 136, 138, 140, 142, 143, 144, 145, 150, 148, 146, 260, 262, 264, 266, 268, 270 to have bodies which may have protrusions, openings, and/or indentations of a desired geometrical shape and size. 24 allow the members, such as member 22, to be relatively light weighed and yet durable.

It is to be understood that the various inventions are not limited to the exact construction or methodology which has been illustrated above, but that various changes and modifications may be made without departing from the inventions as they may be further delineated in the following claims. Thus, what is described is a seat assembly having only a relatively few light weighed and durable members which may each be formed by a unitized injection molding process.

Figure 18:
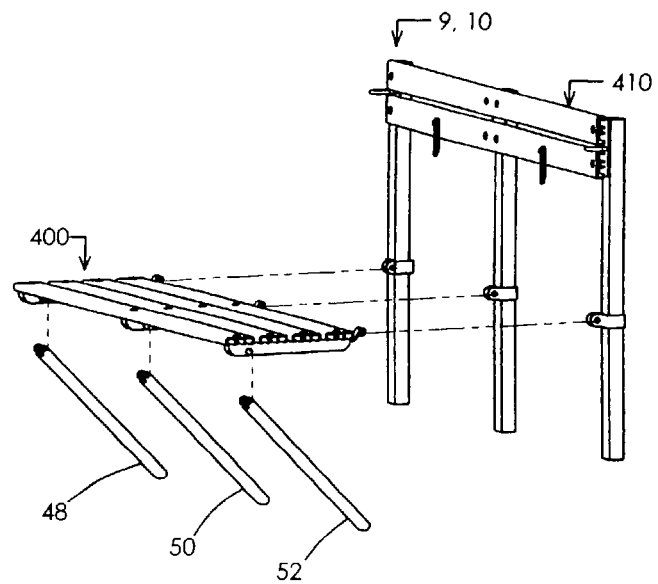
FIG. 18 is an unassembled perspective view of a side seat assembly which is made in accordance with the teachings of an alternate embodiment of the invention and which comprises as a three (3) part system which is cooperatively formed by a one piece backrest, one piece seat platform, and multiple leg members.

In another alternate embodiment of the invention, as shown best in FIG. 18, member 48, 50, 52 maybe separately formed in a respectively unique molding operation, assembly 400 may be separately formed in a respective molding operation, and assembly 410 may be separately formed in a unique molding operation.

Figure 7A:
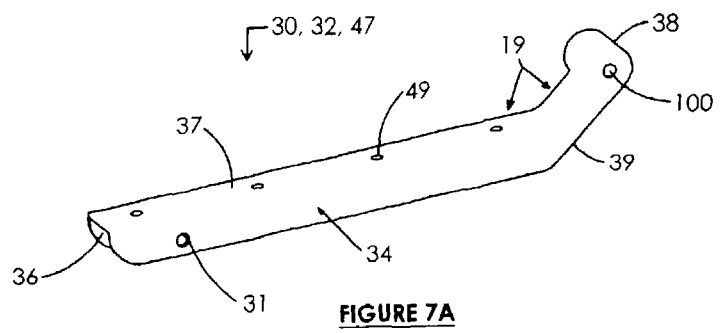
FIGS. 7(a-b) are respective front and back perspective views of a side seat support member used within the seating support portion which is shown in FIG. 6.
Figure 7B:
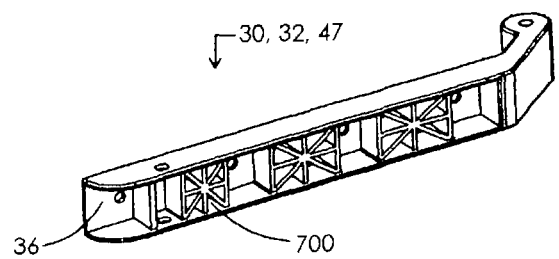
Figure 8:
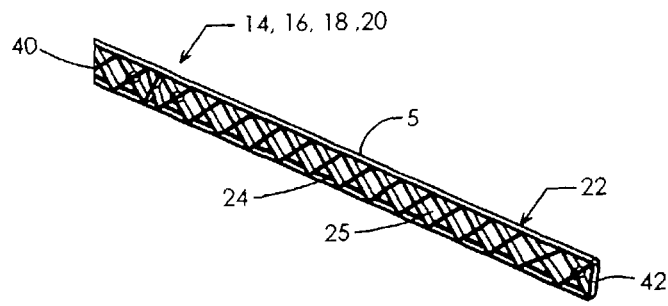
FIG. 8 is a perspective view of a seat member which forms part of the side seating assemblies which are shown in FIG. 1.
Figure 9A:
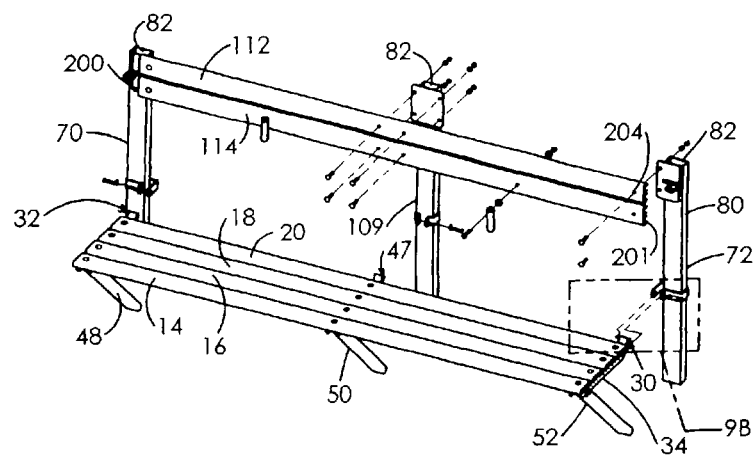
FIGS. 9(a-b) are partial unassembled perspective views of side seating assembly which is shown in FIG. 1.
Figure 9B:
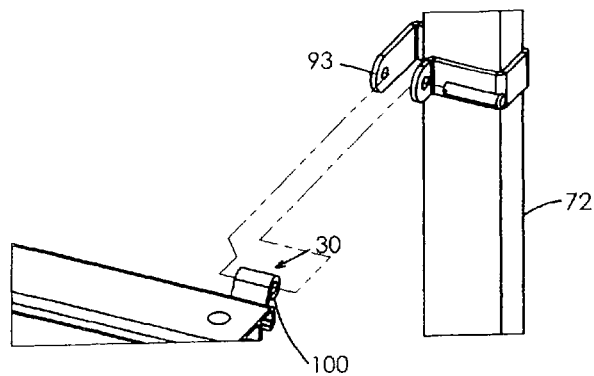
Figure 10:
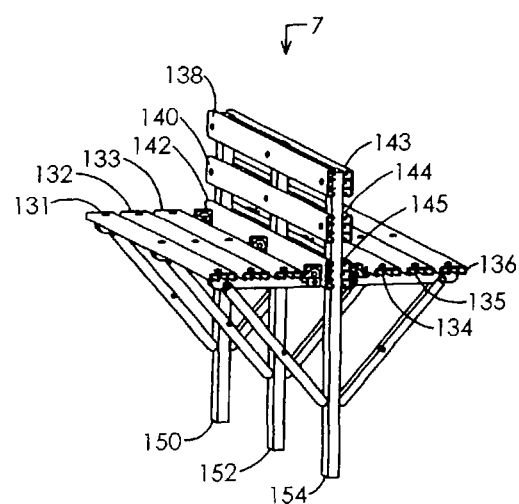
FIG. 10 is an assembled perspective view of the center seating assembly which is shown in FIG. 1.
Figure 11:
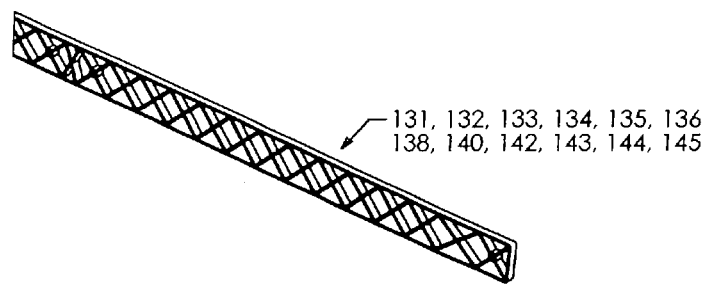
FIG. 11 is a perspective view of a backrest and seat member which is included with the seating assembly which is shown in FIG. 10.
Figure 12:
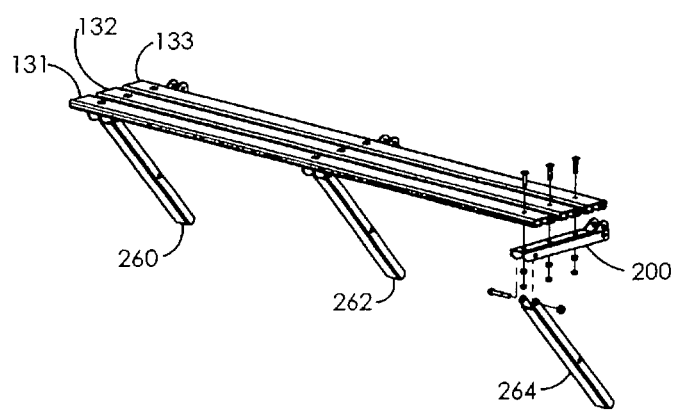
FIG. 12 is an unassembled perspective view of the seating portion of the center assembly which is shown in FIG. 1.
Figure 13:
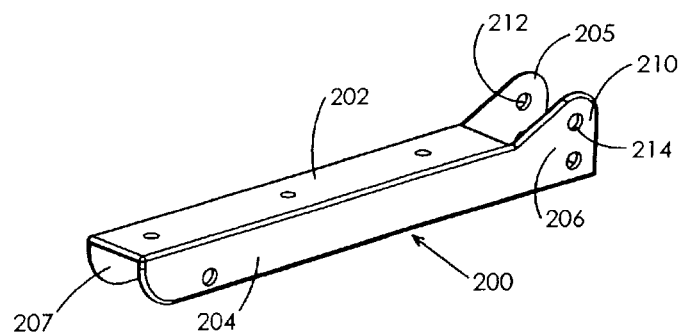
FIG. 13 is a perspective exploded view of a seating member which is included with the seating portion which is shown in FIG. 12.
Figure 14A:
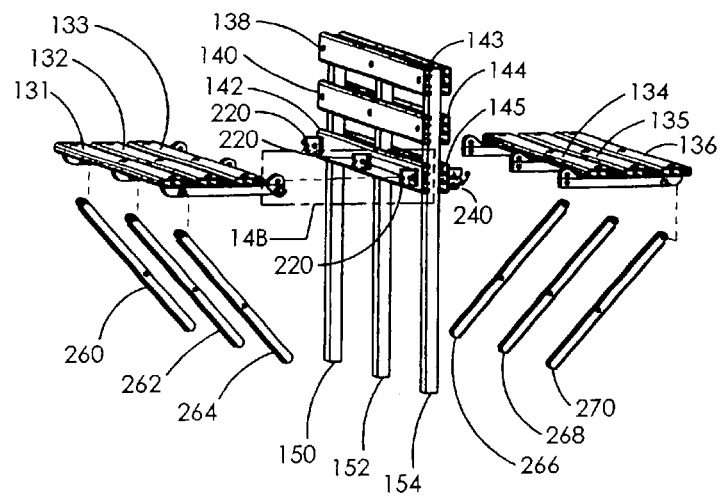
FIGS. 14(a-b) are partial unassembled perspective views of the center seat assembly which is shown in FIG. 1.
Figure 14B:
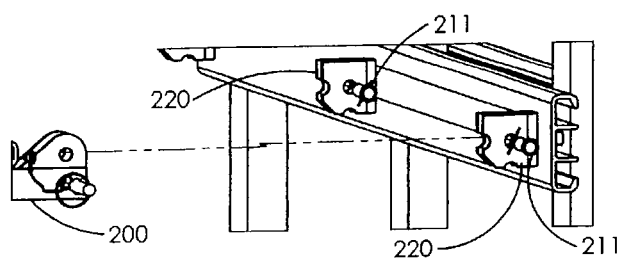

Assembly 400 is substantially identical to the previously described assembly of members 14, 16, 18, 20 and members 30, 32, 47, as is perhaps best shown in FIG. 7. Assembly 410 is substantially identical to the assembly of members 70, 72, 109, and 112, 114, as is best perhaps shown in FIG. 4. Thus, with six separate and distinct molding operations, an edge seat assembly 9, 10 may created.

Figure 19:
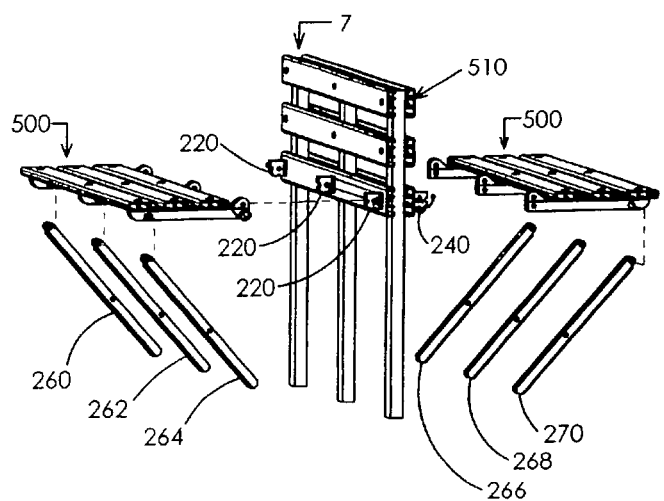
FIG. 19 is an unassembled perspective view of a center seat assembly which is made in accordance with the teachings of an alternate embodiment of the invention and which comprises as a three (3) part system which is cooperatively formed by a one piece backrest, one piece seat platform, and multiple leg members.
Figure 20:
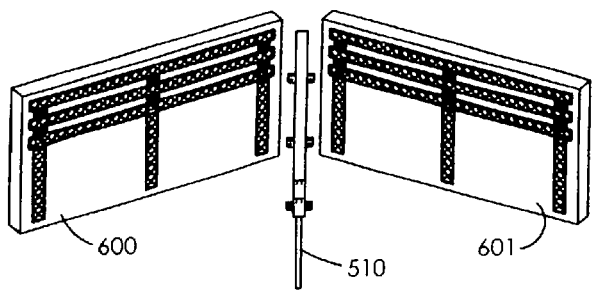
FIG. 20 is a perspective retracted view of a mold made in accordance with the teachings of an alternate embodiment of the invention in combination with a procured item.

Similarly, as shown best in FIG. 19, eight separate molding operations may yield the center seat assembly 7. For example, members 260, 262, 264, 266, 268, and 270 may be separately formed. Assembly 500 may be separately formed twice and assembly 500 is substantially identical to the assembly of members 131, 132, 133 (or members 134, 135, 136) in combination with three members 200. Assembly 510 is substantially similar to the combination of members 150, 152, 154, members 138, 140, 142, 143, 144, 145 and hinges 220, 240. Therefore, in eight or nine molding operations, an entire center seat assembly 7 may be created. For instance, each leg 260, 262, 264, 266, 268, 270 may be separately molded or molded at the same time in one mold. Also, seat assembly 500 may be separately molded and back rest assembly 510 may be separately molded. With regard to the side seat assemblies, each leg 48, 50, 52, may be separately molded or molded at the same time in one mold. Also, seat assembly 400 may be separately molded and backrest assembly 410 may be separately molded.

The invention claimed is:

1. A seat assembly comprising a plurality of substantially identical ribbed seat members, wherein each of said plurality of substantially identical ribbed seat members have a ribbed body, are linearly coextensive, and have respective and opposed ends, and wherein each of said ribbed bodies having a first broad continuously smooth and closed surface and a second opposed surface within which a plurality of open honeycomb cells are formed which outwardly protrude away from said first broad surface; a first seat support assembly which is coupled to respective first of said opposed ends of said ribbed seat members; a second seat support assembly which is coupled to a respective second of said opposed ends of said ribbed seat members, wherein said first and second seat support assemblies are substantially identical and comprise a narrow "L" shaped body having a trench which is formed on a first portion of said narrow "L" shaped body and bulbous second end which is formed on a second portion of narrow "L" shaped body and wherein said first portion of said narrow "L" shaped body forms an obtuse angle with said second portion of said "L" shaped body and wherein each of said plurality of said ribbed seat members have respective first ends attached to said first portion of said narrow "L" shaped body and respective second ends attached to said second portion of said narrow "L" shaped body, and wherein said bulbous second ends protruding away from said ribbed seat members; a plurality of substantially identical ribbed back rest members, wherein each of said plurality of substantially identical back rest members are linearly coextensive and have respective first and second ends; a plurality of hollow canopy reception members which are coupled to said plurality of substantially identical ribbed back rest members, wherein each have a respective longitudinal axis of symmetry which is perpendicular to each of said plurality of backrest members and wherein a first one of said plurality of said hollow canopy reception members is deployed proximate to first respective ends of said backrest members and wherein a second one of said plurality of said hollow canopy reception members is deployed proximate to second respective ends of said back rest members; and a plurality of substantially identical leg members which are respectively coupled to unique seat support assemblies and which respectively form an acute angle with respective to said seat members.

2. A seat assembly comprising a plurality of coupled seat members which are formed as one item in one single mold operation, each of said coupled seat members having a ribbed body, being linearly coextensive, and having respective and opposed ends and wherein each of said ribbed bodies having a plurality of open protruding cells formed therein and wherein at least two of said open protruding cells are dissimilar; a first seat support assembly which is coupled to a first of the opposed ends; a second seat support assembly which is coupled to a respective second of the opposed ends, wherein each of said first and second seat assemblies are substantially identical and comprise a narrow "L" shaped body having a trench which formed upon one end of a first portion of said narrow "L" shaped body and a bulbous second end which is formed on a second portion of said narrow "L" shaped body and wherein said first portion of said narrow "L" shaped body forms an obtuse angle with said second portion of said "L" shaped body and wherein each of said plurality of said ribbed seat members having respective first ends attached to said first portion of said narrow "L" shaped body and second ends attached to second portion of said narrow "L" shaped body; a plurality of substantially identical ribbed back rest members, wherein each of the plurality of substantially identical back rest members are linearly coextensive and have respective first and second ends; a plurality of hollow and or hollow end with ribbed structure canopy reception members which are coupled to the plurality of substantially identical ribbed back rest members, wherein each have a respective longitudinal axis of symmetry which is perpendicular to each of the plurality of backrest members and wherein a first one of the plurality of the hollow canopy reception members is deployed proximate to first respective ends of the backrest members and wherein a second one of the plurality of said hollow canopy reception members is deployed proximate to second respective ends of the back rest members; and a plurality of substantially identical leg members which are respectively coupled to unique seat support assemblies and which respectively form an acute angle with respective to the seat members.

* * * * *